United States Patent [19]

Bookwalter et al.

[11] Patent Number: 4,842,884
[45] Date of Patent: Jun. 27, 1989

[54] FORMULATED MILK CONCENTRATE AND BEVERAGE

[75] Inventors: George N. Bookwalter, Peoria; Steven A. Lyle, East Peoria, both of Ill.

[73] Assignee: The United States of America as represented by the Secretary of Agriculture, Washington, D.C.

[21] Appl. No.: 189,079

[22] Filed: May 2, 1988

[51] Int. Cl.$^4$ .......................... A23C 11/04; A23C 3/04
[52] U.S. Cl. ..................................... 426/585; 426/565; 426/580; 426/587; 426/588
[58] Field of Search ................ 426/565, 580, 585, 587, 426/588

[56] References Cited

U.S. PATENT DOCUMENTS 2,633,424 3/1953 Otting et al. ........................ 426/565
3,011,893 12/1961 Kneeland ................................. 99/63
3,126,283 3/1964 Noznick et al. ...................... 426/580

Primary Examiner—Donald E. Czaja
Assistant Examiner—Helen Pratt
Attorney, Agent, or Firm—M. Howard Silverstein; John D. Fado; Curtis P. Ribando

[57] ABSTRACT

A formulated milk concentrate is described comprising about 25-60% by weight of nonfat dry milk solids, 15-40% by weight of water, 3-40% by weight of an edible oil, and 0-35% by weight of sugar, wherein the weight ratio of nonfat dry milk solids to water is between about 1:0.55 and 1:0.75. The concentrate can either be frozen for later use or immediately blended with water to produce a beverage. Within the critical range of milk solids-to-water ratios, edible oils are emulsified to form stable concentrates without the use of emulsifiers or specialized dairy equipment such as homogenizers and colloid mills.

12 Claims, No Drawings

FORMULATED MILK CONCENTRATE AND BEVERAGE

BACKGROUND OF THE INVENTION

1. Field of the Invention

This invention relates to a formulated milk concentrate prepared from nonfat dry milk (NFDM) solids, water, and edible oil by a simple, novel method without adding an emulsifier or using specialized dairy equipment such as homogenizers of colloid mills. The concentrate can either be frozen for later use or blended with water for immediate consumption.

2. Description of The Prior Art

Previous attempts have been made to provide milk concentrates comprising NFDM solids in combination with edible oils. For example, Kneeland (U.S. Pat. No. 3,011,893) reports combining powdered skim milk (18%), vegetable oil (8%), and water (74%) into a filled product that is the equivalent of evaporated or condensed milk. This process requires the use of homogenization equipment and a special heat treatment. Similarly, Noznick et al. (U.S. Pat. No. 3,126,283) disclose a process for preparing a sweetened condensed milk product from NFDM solids (21%), water (29%), edible fat (8%), and sugar (42%) which requires dispersing the fat in equipment that provides homogenization or high-shear mixing.

SUMMARY OF THE INVENTION

We have now surprisingly discovered that when the ratio of NFDM solids to water is carefully held within the critical range of about 1:0.55 to 1:0.75, the resulting viscous mixture will emulsify added oil to form a milk concentrate without the use of emulsifiers or specialized dairy equipment such as homogenizers and colloid mills. This concentrate cab either be frozen for later use or blended with water for immediate consumption.

In accordance with this discovery, it is an object of the invention to introduce a novel formulated milk concentrate prepared by a simple, inexpensive process (hand mixing) that can be used for disaster relief or in developing countries.

Another object of the invention is to provide a milk concentrate that can be frozen for later use as a convenience food.

A further object of the invention is to provide formulated milk beverages suitable for use by the general population or by special groups with dietary restrictions as to the level of milk fat and/or cholestral ingestion.

It is also an object of the invention to provide formulated milk beverages that are tailor made with a variety of solids contents, fat types, added sweeteners, and other constituents.

Other objects and advantages of the invention will become readily apparent from the ensuing description.

DETAILED DESCRIPTION OF THE INVENTION

The terms "formulated milk concentrate" and "milk concentrate" are used herein with reference to high-solids products that contain about 15–40% water. The terms "formulated milk beverage" and "milk beverage" are used with reference to fluid products that contain about 75–90% water. The NFDM useful in this invention is preferably of the low-heat type, either in the powder or instantized form because of its relatively high dispersibility. Medium-type and high-heat type can also be used. The heat type generally refers to the processing parameters employed to denature whey protein prior to spray drying. However, because of the various effects that the combination of heat, time and moisture content can have on the final product, the NFDM is classified by heat type according to its whey protein nitrogen content. Thus, the specifications of low-heat type NFDM are 6.0 mg/g whey protein and above; medium-heat NFDM has a whey protein nitrogen content ranging from 1.51 to 5.99 mg/g; and high-gheat type NFDM has a whey protein nitrogen content of 1.5 and below. The NFDM disclosed herein will be assumed to be equivalent to that produced in the United States as "U.S. Extra Grade" having a specified moisture content within the range of 3–4%, dry weight basis. Other NFDM solids having moisture contents outside this range are also contemplated herein, with the understanding that adjustments may be necessary in the proportion of solids to added water discussed below.

The new formulated milk concentrates of the invention are prepared by blending under low shear conditions 1 part by weight of the NFDM solids with about 0.55 to 0.75 part of water to form a smooth batter. It is critical that the amount of water be within this sharply defined range in order to effectively utilize the intrinsic properties of the NFDM constituents to emulsify the subsequently added edible oil. The low shear blending may be accomplished by manual stirring with a spatula or other suitable utensil, or by use of a mechanical blender or mixer.

An edible oil in an amount of about 0.1 to 1.0 parts, and preferably 0.4–0.9 parts, per part NFDM solids is then added to the batter and emulsified by blending under low shear conditions. It is anticipated that any edible oil, especially non-dairy lipids, such as soybean, corn, peanut, sunflower, rapeseed, safflower, or fish oil, or any combination of such oils, may be used. In this way, the product can be adapted to the needs or desires of a variety of consumers, including those with dietary restrictions and those desiring to substitute polyunsaturated fats for milk fat.

Sugar in an amount of up to 1 part per part of NFDM solids may be incorporated into the products of this invention, either to increase their caloric density or to modify their flavor. The sugar may be introduced either by dry combination with the NFDM solids before the blending with water to form a milk concentrate or by addition when the concentrate is diluted with water to form a beverage.

On a percentage basis, the components of the concentrate will be in the following ranges: 25–40% NFDM, 15–40% water, 3–40% edible oil, and 0–35% sugar.

For the purpose of preparing a beverage, the milk concentrates of this invention are diluted with water in an amount of about 9 parts per part of NFDM solids in the concentrate. It is preferred that the dilution water be boiled for a minimum of 5 min before it is blended with the concentrate and that the resulting beverage be held at 72°–76° C. for 5–10 min to achieve pasteurization conditions. The milk concentrates may be frozen and stored under freezing conditions. It can thereby be marketed as a convenience product which may be thawed and diluted with water to produce a beverage. Dilution of the concentrate is readily conducted by stirring, shaking, or application of some conventional form of low shear mixing. Prior to consumption, the beverage may be stored for up to about 5 days under normal refrigerated conditions without phase separation.

ing in a Waring blendor. All the final beverages exhibited satisfactory stability; i.e., no cream separated after standing for 5 days at 4° C.

TABLE I

Formulations with Low-Heat Non-Fat Dry Milk

| Example | Amount of water (g) | Part water per one part NFDM | Batter | Emulsion | Beverage |
|---|---|---|---|---|---|
| 1 | 24.0 | 0.55 | Too viscous | Too viscous | Curd would not disperse |
| 2 | 26.5 | 0.61 | Viscous, but satisfactory | Viscous, but satisfactory | Satisfactory[a] |
| 3 | 29.0 | 0.67 | Satisfactory | Satisfactory | Satisfactory[a] |
| 4 | 31.5 | 0.72 | Satisfactory | Satisfactory | Satisfactory[a] |
| 5 | 32.75 | 0.75 | Satisfactory | Satisfactory | Satisfactory[a] |
| 6 | 34.0 | 0.78 | Satisfactory | Satisfactory | Cream separated |
| 7 | 41.5 | 0.95 | Water, lumpy | Incomplete[b] | Cream separated |

[a]The beverage was a lump-free fluid from which no cream separated after standing overnight at 4° C.
[b]Some oil droplets remained unemulsified.

It is envisioned that the milk concentrates of this invention might be used by consumers who require certain types of dietary fats or desire the convenience of a frozen concentrate. The concentrates and beverages might also be useful for food distribution in disaster relief programs. Moreover, because of the simplicity of the procedures involved in their preparation of these products, they appear to be especially adaptable for use in increasing the caloric density of NFDM-based beverages that are distributed to developing countries.

The following examples are intended only to further illustrate the invention and are not intended to limit the scope of the invention which is defined by the claims.

EXAMPLES 1–7

Criticality of the NFDM-to-Water Ratio.

NFDM (low-heat, spray-dried, Dairy Gold Inc., Lynden, WA) in 43.5-g amounts was added while stirring with a spatula to tap water, which had been boiled for 5 min and then cooled to 38° C., in the amounts shown in Table I. The characteristics of the resulting products are described in the "Batter" column of Table I. To each of these products was added 20 g of soybean oil (refined, BI-27, Kraft Inc., Memphis, TN) and the resulting combination was mixed vigorously with a spatula for 2 min. The characteristics of the resulting products are described in the "Emulsion" column of Table I. Each of these products was blended (using a spatula) with sufficient boiled water at 74° C. to give a total of 500 g for each beverage. The characteristics of these products are reported in the "Beverage" column of Table I. As reported in Table I, completely satisafactory results were obtained only in Examples 2–5 wherein the ratio of NFDM solids to water in the initial batter was in the range of 1:0.61 to 1:0.75.

EXAMPLES 8–11

Frozen Concentrate.

The procedures of Examples 2–5 were followed except that the four milk concentrates (emulsions) were frozen overnight at −18° C. and then thawed prior to dilution to form beverages. The dilutions were performed by adding water to the concentrates while mix-

EXAMPLES 12–16

Use of Medium-Heat, Spray-Dried NFDM.

The procedures of Examples 1–7 were repeated except that the low-heat NFDM was replaced with the medium-heat type (medium-heat spray-dried NFDM, O-AT-KA Milk Products Coop. Inc., Batavia, NY), and the amounts of water were as reported in Table II. The data in this table show that completely satisfactory results were obtained only in Examples 13–15 wherein the ratio of NFDM solids to water in the initial batter was in the range of 1:0.55 to 1:0.67, in contrast to the results obtained with low-heat NFDM (Examples 1–7).

EXAMPLES 17–19

Use of High-Heat, Spray-Dried NFDM.

The procedures of Examples 1–7 were repeated except that the low-heat NFDM was replaced with the high-heat type (high-heat spray-dried NFDM, Associated Milk Producers Inc., New Prague, MN), and the amounts of water were as reported in Table III. The data in this table show that completely satisfactory results were obtained only in Example 18 wherein the ratio of NFDM solids to water in the initial batter was 1:0.72, in contrast to the results obtained with low-heat NFDM (Examples 1–7) and with medium-heat NFDM (Examples 12–16).

EXAMPLES 20–27

Use of Instantized NFDM.

The procedures of Examples 1–7 were repeated except that the low-heat NFDM powder was replaced with instantized low-heat NFDM (Carnation Natural NFDM, fortified, extra grade, Carnation Co., Los Angeles, CA), and the amounts of water were as reported in Table IV. The data in this table show that completely satisfactory results were obtained in Examples 21 and 22 wherein the ratio of NFDM solids to water in the initial batter was between 1:0.75 and 1:0.78, in contrast to the results obtained with low-heat NFDM that was not instantized (Examples 1–7)

TABLE II

Formulations with Medium-Heat Non-Fat Dry Milk

| Example | Amount of water (g) | Part water per one part NFDM | Batter | Emulsion | Beverage |
|---|---|---|---|---|---|
| 12 | 21.5 | 0.49 | Too viscous | Incomplete[a] | Curd would not disperse |

TABLE II-continued

Formulations with Medium-Heat Non-Fat Dry Milk

| Example | Amount of water (g) | Part water per one part NFDM | Product characteristics | | |
|---|---|---|---|---|---|
| | | | Batter | Emulsion | Beverage |
| 13 | 24.0 | 0.55 | Satisfactory | Satisfactory | Satisfactory[b] |
| 14 | 26.5 | 0.61 | Satisfactory | Satisfactory | Satisfactory[b] |
| 15 | 29.0 | 0.67 | Satisfactory | Satisfactory | Satisfactory[b] |
| 16 | 34.0 | 0.78 | Satisfactory | Satisfactory | Cream separated |

[a]Some oil remained unemulsified.
[b]No cream separated after standing for 3 days at 4° C.

TABLE III

Formulations with High-Heat Non-Fat Dry Milk

| Example | Amount of water (g) | Part water per one part NFDM | Product characteristics | | |
|---|---|---|---|---|---|
| | | | Batter | Emulsion | Beverage |
| 17 | 29.0 | 0.67 | Too viscous | Too viscous | Cream separated |
| 18 | 31.5 | 0.72 | Satisfactory | Satisfactory | Satisfactory[a] |
| 19 | 34.0 | 0.78 | Satisfactory | Incomplete[b] | Cream separated |

[a]No cream separated after standing for 3 days at 4° C.
[b]Some oil remained unemulsified.

TABLE IV

Formulations with Instantized Non-Fat Dry Milk

| Example | Amount of water (g) | Part water per one part NFDM | Product characteristics | | |
|---|---|---|---|---|---|
| | | | Batter | Emulsion | Beverage |
| 20 | 31.5 | 0.72 | Satisfactory | Too viscous | Curd would not disperse |
| 21 | 32.5 | 0.75 | Satisfactory | Viscous, but satisfactory | Satisfactory[a] |
| 22 | 34.0 | 0.78 | Satisfactory | Viscous, but satisfactory | Satisfactory[a] |
| 23 | 36.5 | 0.84 | Satisfactory | Satisfactory | Cream separated |
| 24 | 39.0 | 0.90 | Satisfactory | Satisfactory | Cream separated |
| 25 | 41.5 | 0.95 | Satisfactory | Satisfactory | Cream separated |
| 26 | 44.0 | 1.01 | Satisfactory | Satisfactory | Cream separated |
| 27 | 46.5 | 1.07 | Satisfactory | Satisfactory | Cream separated |

[a]No cream separated after standing overnight at 2° C.

EXAMPLE 28

Use of Various Oils.

The procedure of Example 4 was repeated except that the following oils were substituted for the soybean oil:(a) corn ("Crisco," Procter & Gamble Co., Cincinnati, OH), (b) safflower (Hollywood Foods, Los Angeles, CA), (c) sunflower ("Wesson" unlite, Beatrice/Hunt-Wesson Foods, Fullerton, CA), (d) canola (low-erucic-acid rapeseed oil, "Puritan," Procter & Gamble Co., Cincinnati, OH), and (e) peanut ("Planters," Nabisco Inc., East Hanover, NJ). All the oils were emulsified satisfactorily, and all the resulting beverages were satisfactory; i.e., no cream separated after standing for 2 days at 2° C.

EXAMPLE 29

Incorporation of a High Level of Soybean Oil.

The procedure of Example 3 was repeated except that the amount of soybean oil was doubled (40 g). All the oil was emulsified satisfactorily, and the resulting beverage was satisfactory; i.e., no cream separated after standing for 2 days at 4° C. The proportion of oil in the final beverage amounted to 8%.

EXAMPLE 30

Inclusion of Sugar in the Compositions.

The general procedure of Examples 1–7 was followed except that the amount of NFDM was 19 g, and it was mixed in the dry state with 10 g of sucrose ("Domino Sugar - Granulated," Amstar Sugar Corp., New York, NY) before blending with the water (15 g, 0.79 part per part of NFDM). The amount of soybean oil was 10 g, and the total weight of beverage was 229 g. The initial batter was smooth and free of lumps; the emulsion satisfactorily incorporated all the oil; and the stability of the final beverage was satisfactory.

EXAMPLE 31

The procedure of Example 30 was repeated except that dextrose (Difco Laboratories, Detroit, MI) was substituted for the sucrose. All the resulting compositions were satisfactory.

EXAMPLE 32

Use of Mechanical Mixing.

The ingredient ratios of Example 4 were followed, but the amounts of the ingredients were increased 22-fold, and all mixing was done with an air-driven low shear mixer. Thus, 957 g of the NFDM was mixed into 693 g of water to form the batter; 440 g of the soybean oil was mixed in this batter to form the emulsion; and 8910 g of water was mixed into this emulsion to form the beverage. All the resulting compositions were satisfactory; no cream separated from the final beverage after standing for 2 days at 2° C. the mixing characteristics of the compositions were such that all operations could have been done manually instead of mechanically.

It is understood that the foregoing detailed description is given merely by way of illustration and that

We claim:

1. A formulated milk concentrate emulsion comprising about 25-60% by weight of nonfat dry milk solids, 15-40% by weight of water, 3-40% by weight of a nondairy edible oil, and 0-35% by weight of sugar, wherein the weight ratio of nonfat dry milk solids to water is between 1:0.55 and 1:0.75 and wherein there is no added emulsifier.

2. The formulated milk concentrate of claim 1 wherin the nonfat dry mild is selected from the group consisting of the low-heat type nonfat dry milk and instantized nonfat dry milk.

3. The formulated milk concentrate of claim 1 wherein the edible oil is selected from the group consisting of soybean oil, corn oil, peanut oil, sunflower oil, rapeseed oil, safflower oil, fish oil, and combinations thereof.

4. A process for preparing a formulated milk concentrate from nonfat dry milk and a non-dairy edible oil without an emulsifier comprising the steps of:

a. blending under low shear conditions 1 part by weight of nonfat dry milk solids with aobut 0.55-0.75 part water to form a smooth batter;

b. adding an edible oil to the batter and mixing under low shear conditions the resulting combination to form an emulsion.

5. The process of claim 4 wherein the nonfat dry milk is selected from the group consisting of the low-heat type nonfat dry milk and instantized nonfat dry milk.

6. The process of claim 4 wherein the edible oil is selected from the group consisting of soybean oil, corn oil, peanut oil, sunflower oil, rapeseed oil, safflower oil, fish oil, and combinations thereof.

7. The process of claim 4 and fruther comprising the step of freezing said emulsion.

8. The process of claim 4 and further comprising diluting said emulsion with sufficient water to produce a formulated milk beverage.

9. A formulated milk concentrate produced by the process of claim 4.

10. A formulated milk concentrate produced by the process of claim 6.

11. A formulated milk concentrate produced by the process of claim 7.

12. A formulated milk beverage produced by the process of claim 8.

* * * * *